United States Patent
Pihl et al.

(10) Patent No.: US 10,833,711 B2
(45) Date of Patent: Nov. 10, 2020

(54) SYSTEM, APPARATUS AND METHOD FOR CONCURRENT RECEPTION OF MULTIPLE CHANNELS SPACED PHYSICALLY IN RADIO FREQUENCY SPECTRUM

(71) Applicant: Silicon Laboratories Inc., Austin, TX (US)

(72) Inventors: Jacob Pihl, Kongens Lyngby (DK); Peter Østergaard Nielsen, Ishøj (DK)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/225,562

(22) Filed: Dec. 19, 2018

(65) Prior Publication Data

US 2020/0204200 A1 Jun. 25, 2020

(51) Int. Cl.
*H04B 1/00* (2006.01)
*H04B 1/16* (2006.01)
*H04B 1/10* (2006.01)

(52) U.S. Cl.
CPC .............. *H04B 1/0007* (2013.01); *H04B 1/10* (2013.01); *H04B 1/1607* (2013.01)

(58) Field of Classification Search
CPC ..... H04W 88/06; H04B 1/1607; H04B 1/005; H04B 1/10
See application file for complete search history.

(56) References Cited

U.S. PATENT DOCUMENTS

| | | | |
|---|---|---|---|
| 6,275,540 B1* | 8/2001 | Barrett, Jr. ........... | H04B 1/0003 341/143 |
| 6,823,181 B1 | 11/2004 | Kohno et al. | |
| 8,442,473 B1* | 5/2013 | Kaukovuori ............ | H04B 1/16 375/324 |
| 8,849,232 B2* | 9/2014 | Kaukovuori ......... | H04B 1/0075 455/313 |
| 2002/0176522 A1* | 11/2002 | Fan ....................... | H03D 3/007 375/340 |
| 2004/0152426 A1* | 8/2004 | Suzuki ................ | H04B 1/0475 455/83 |
| 2010/0048157 A1* | 2/2010 | Carrera ................... | G01S 19/32 455/307 |

(Continued)

OTHER PUBLICATIONS

Silicon Labs, "Datasheet: ZM5101 Fully Integrated Z-Wave® Wireless System-in-Package," Mar. 2018, 47 pages.

(Continued)

*Primary Examiner* — Khanh C Tran
(74) *Attorney, Agent, or Firm* — Trop, Pruner & Hu, P.C.

(57) ABSTRACT

In one embodiment an apparatus includes: a mixer to downconvert a radio frequency (RF) spectrum including at least a first RF signal of a first channel of interest and a second RF signal of a second channel of interest to at least a first second frequency signal and a second second frequency signal; a first digitizer to digitize the first second frequency signal to a first digitized signal, the first digitizer configured to operate as a low-pass analog-to-digital converter (ADC); a second digitizer to digitize the second second frequency signal to a second digitized signal, the second digitizer configured to operate as a band-pass ADC; and a digital processor to digitally process the first digitized signal and the second digitized signal.

17 Claims, 6 Drawing Sheets

(56) References Cited

U.S. PATENT DOCUMENTS

| 2012/0076249 A1* | 3/2012 | Seo | H04B 1/0007 |
| | | | 375/349 |
| 2013/0039444 A1* | 2/2013 | Porret | H04B 1/0007 |
| | | | 375/316 |
| 2014/0119485 A1* | 5/2014 | Seo | H04L 25/08 |
| | | | 375/349 |
| 2015/0256207 A1* | 9/2015 | Liao | H04B 1/0007 |
| | | | 375/349 |

OTHER PUBLICATIONS

Raoul Wijgergangs, "Z-Wave to IP Software/Firmware Bridges the Worlds of Z-Wave and IoT," at least as early as Dec. 1, 2018, 6 pages.
Silicon Labs, "Z-Wave FLiRS:Enabling Wireless Smart Door Locks and Thermostat," at least as early as Dec. 1, 2018, 4 pages.

* cited by examiner

SYSTEM, APPARATUS AND METHOD FOR CONCURRENT RECEPTION OF MULTIPLE CHANNELS SPACED PHYSICALLY IN RADIO FREQUENCY SPECTRUM

BACKGROUND

With the ever increasing connectedness of many types of devices coupled together in different network architectures, wireless receivers are being incorporated into a variety of device types. Many of these devices are small battery-powered devices, and the power consumption of wireless communication can be a significant driver of battery wear. To this end, many devices implement techniques to operate in low power modes when not being used. Nevertheless, increased emphasis is being placed on providing wireless communication with reduced power consumption.

Certain wireless devices implement multiple wireless receivers so that they can communicate on physically spaced channels. However, having multiple receivers adversely increases power consumption.

SUMMARY OF THE INVENTION

In one aspect, an apparatus includes: a low noise amplifier (LNA) to receive and amplify a radio frequency (RF) spectrum including at least a first RF signal of a first channel of interest and a second RF signal of a second channel of interest; a mixer to downconvert the first RF signal to a first second frequency signal and to downconvert the second RF signal to a second second frequency signal; a first digitizer to digitize the first second frequency signal to a first digitized signal, the first digitizer configured to operate as a low-pass analog-to-digital converter (ADC); a second digitizer to digitize the second second frequency signal to a second digitized signal, the second digitizer configured to operate as a band-pass ADC; and a digital processor to digitally process the first digitized signal and the second digitized signal.

In an example, the apparatus further comprises a controller to configure a local oscillator to generate a mixing signal having a frequency between a frequency of the first channel of interest and a frequency of the second channel of interest. The mixer may be a complex mixer to downconvert the first RF signal to positive and negative first second frequency signals and downconvert the second RF signal to positive and negative second second frequency signals. The controller may be configured: for a first time period, to configure the second ADC to operate at a first center frequency to digitize and pass the second channel of interest; and for a second time period, to configure the second ADC to operate at a second center frequency to digitize and pass a third channel of interest.

In an example, the controller may dynamically control a center frequency for the second ADC to perform frequency hopping for a plurality of channels of interest. The apparatus may further include a low-pass filter coupled between the mixer and the first and second digitizers. The controller may configure the low-pass filter to operate at plurality of cutoff frequencies, each of the plurality of cutoff frequencies associated with a corresponding center frequency for the second digitizer. The controller may cause the second digitizer to be powered off when the apparatus is in operation in a low power mode. The first digitizer may digitize information of the first channel of interest, where the first channel of interest is a fixed channel and the frequency of the mixing signal is to be fixed. In an example the first and second digitizers may be delta-sigma converters. The first and second digitizers also may be configured as complex ADCs.

In another aspect, a method includes: configuring, via a controller, a first ADC of a receiver to operate at a low-pass to capture a first channel of interest; configuring, via the controller, a second ADC of the receiver to operate at a band-pass to capture a second channel of interest; receiving, in a common receiver signal processing path of the receiver, a RF spectrum, downconverting the RF spectrum to an intermediate frequency (IF) spectrum including the first channel of interest and the second channel of interest, and providing the IF spectrum from the common receiver signal processing path to the first ADC and the second ADC; in the first ADC, digitizing the first channel of interest into a first digitized signal and providing the first digitized signal to at least one digital processor; and in the second ADC, digitizing the second channel of interest into a second digitized signal and providing the second digitized signal to the at least one digital processor.

In an example, the method further comprises re-configuring, via the controller, the second ADC to operate at a second band-pass to capture a third channel of interest. The method may further comprise: configuring a low-pass filter of the common receiver signal processing path to operate at a first cutoff frequency to enable the second channel of interest to be passed; and re-configuring the low-pass filter to operate a second cutoff frequency to enable the third channel of interest to be passed. The method may further comprise re-configuring the low-pass filter and the second ADC according to a predetermined schedule to enable frequency hopping for a plurality of channels of interest. The method may further comprise: causing the second ADC to enter into a low power mode; detecting a beam signal via the first ADC; and in response to the beam signal, causing the second ADC to exit the low power mode to enable the second ADC to digitize the second channel of interest.

In yet another aspect, a system includes: a first internet of things (IoT) device to perform one or more functions. The first IoT device may include: a common receiver signal processing path having a LNA to receive and amplify a RF spectrum including at least a first RF signal of a first channel of interest and a second RF signal of a second channel of interest, and a mixer to downconvert the first RF signal to a first IF signal and to downconvert the second RF signal to a second IF signal; a first ADC coupled to the common receiver signal processing path to digitize the first IF signal to a first digitized signal, the first ADC configured to operate at a low-pass; a second ADC coupled to the common receiver signal processing path to digitize the second IF signal to a second digitized signal, the second ADC configured to operate at a controllable band-pass; and a digital processor to digitally process the first digitized signal and the second digitized signal. The system may further include a plurality of devices coupled to the first IoT device, where at least one of the plurality of devices comprises a control device to communicate with the first IoT device via at least another one of the plurality of devices.

In an example the first IoT device further comprises a controller to configure a local oscillator to generate a mixing signal having a frequency between a frequency of the first channel of interest and a frequency of the second channel of interest. The controller may be configured to dynamically control a center frequency for the second ADC to perform frequency hopping for a plurality of channels of interest, where the controller is to cause the second ADC to operate for a first time period at a first center frequency to digitize and pass the second channel of interest and to operate for a second time period at a second center frequency to digitize and pass a third channel of interest.

The common receiver signal processing path may include a low-pass filter, and the controller is to configure the low-pass filter to operate at plurality of cutoff frequencies, each of the plurality of cutoff frequencies associated with a corresponding center frequency at which the second ADC is to operate. The controller may also cause the second ADC to enter into a low power mode, and in response to a beam signal received from the control device, cause the second ADC to exit the low power mode to enable the second ADC to digitize and pass the second channel of interest.

DETAILED DESCRIPTION

In various embodiments, a receiver for incorporation into many different device types including battery-operated low power devices may be implemented with a common front end signal processing path to perform analog signal processing operations on a received radio frequency (RF) spectrum. After downconversion and potentially additional processing in this common front end receiver signal processing path, the downconverted signal spectrum is provided to multiple back end signal processing paths including multiple independent digitizers, which may be differently configured and controlled to a given one of multiple channels of interest concurrently. Thereafter additional back end processing circuitry such as digital signal processing circuitry may further process the digitized signals, including performing demodulation and potentially other signal processing operations.

In this way, embodiments enable a receiver architecture with reduced chip real estate and lower power consumption, owing to the presence of a single front end receiver signal processing path. In addition, power consumption may be further reduced by dynamically causing one or more of the multiple backend receiver signal processing paths (including corresponding digitizers) to be disabled or otherwise placed in a low power mode, when a receiver does not need to concurrently receive and process multiple channels of interest. While embodiments are described herein in the context of integrated circuit (IC)-based receivers that are implemented within small devices such as internet of things (IoT) devices, understand that embodiments herein may be implemented in other types of devices and receiver architectures.

Figure 1:
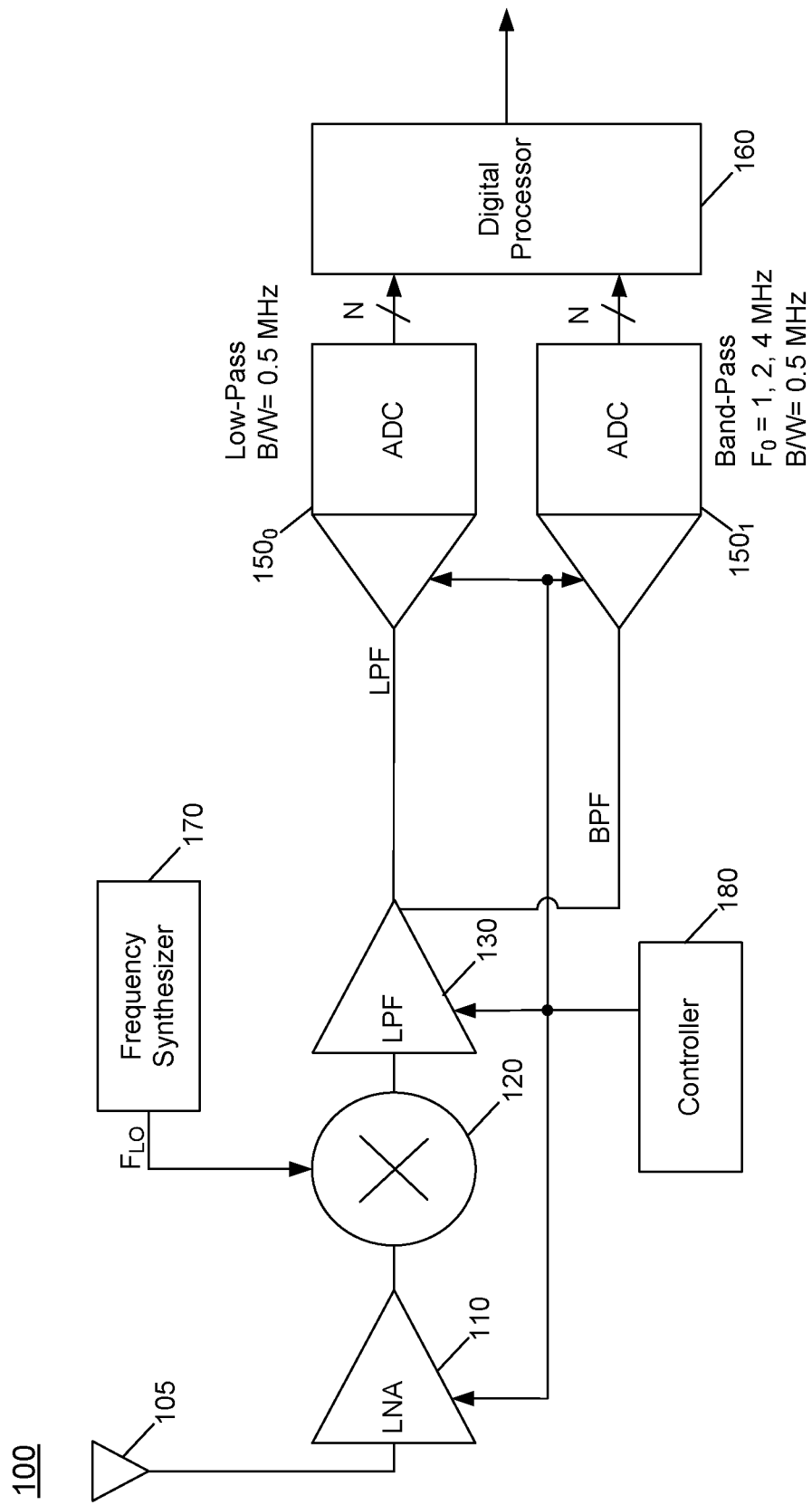
FIG. 1 is a block diagram of a receiver in accordance with one embodiment.

Referring now to FIG. 1, shown is a block diagram of a receiver in accordance with one embodiment. As shown in FIG. 1, receiver 100 is a radio receiver, which may be implemented in a given integrated circuit, such as a given IoT device. In embodiments, receiver 100 may be implemented on a single semiconductor die and integrated in an integrated circuit (IC) package. With a configuration as in FIG. 1, a common front end signal processing path is in turn coupled to multiple back end signal processing paths to enable concurrent reception of multiple channels that are spaced physically apart in an RF spectrum.

As illustrated, receiver 100 is coupled to receive incoming RF signals from an antenna 105. Note that antenna 105 may be external from the IC/semiconductor device, in many cases. In any event, RF signals received via antenna 105 are provided to a low noise amplifier (LNA) 110. In embodiments, LNA 110 may provide a controllable amount gain to the RF signals, e.g., approximately 20 decibels (dB) of gain. Although embodiments may vary, in an implementation for a Z-Wave communication protocol, these incoming signals may be received at one or more RF frequencies of between 800 megahertz (MHz) and 1 gigahertz (GHz).

The amplified RF signals may be provided in turn from LNA 110 to a mixer 120, which operates to downconvert the RF spectrum to a lower frequency, e.g., one or more given intermediate frequency (IF) signals. Each channel has its own modulated carrier. When the received RF signal includes multiple, concurrently active channels, then the downconverted result includes equally many non-overlapping IF bands, each centered around the respective downconverted carrier. Distinct RF carriers contribute distinct IF frequencies. In effect, the resulting IF signal is the sum of multiple IF signal, one for each channel. To this end, mixer 120 receives a local oscillator frequency ($F_{LO}$) as generated in a local oscillator, such as a frequency synthesizer 170 (and which also may be adapted on the same semiconductor die as the rest of receiver 100). As described herein, embodiments may be used to control the LO frequency based at least in part on one or more channels of interest within the RF spectrum. In embodiments herein, this LO frequency may be in the range of between approximately 800 and 1000 MHz.

Still with reference to FIG. 1, the downconverted IF signal sources are provided to a low-pass filter (LPF) 130, which may perform a low-pass function on the IF signals to pass signals in a range between 0-5.5 MHz. As illustrated in FIG. 1, LPF 130 may (in slightly more complex implementations) split the band into two or more sub-bands, e.g., one band covering the lower end (LP) and the other band covering the upper part, or a fraction of the upper part (BP). As will be described herein, the cutoff frequency (or frequencies) of LPF 130 may be controlled based at least in part on one or more channels of interest within the IF spectrum, to ensure that they pass through LPF 130 to further portions of the signal processing path. In embodiments, the gain through the single or multiple LPF paths is controllable and controlled by an AGC subsystem (e.g., implemented in a controller 180). While these particular components discussed above are present in this example common signal processing path, additional or different components may be present in other embodiments.

In turn, gain controlled IF signals are provided to multiple parallel signal processing paths including analog-to-digital converters (ADCs) $150_0$-$150_1$. Understand while only two ADCs are shown for ease of illustration, in some embodiments more than two parallel processing paths including ADCs may be present. In the embodiment shown, ADC $150_0$ may be configured as a low-pass ADC having a bandwidth of approximately 0.5 MHz and centered near 250 kHz. In embodiments, ADC $150_0$ may be configured to process a channel that does not move in frequency and is to be available all the time.

In turn, ADC $150_1$ may be implemented as a band-pass ADC having a controllable center frequency and a bandwidth of approximately 0.5 MHz. Depending upon a selected channel of interest, in one embodiment ADC $150_1$ may be dynamically controlled to have center frequencies of 1, 2 or 4 MHz. Of course other example center frequencies are possible in other embodiments. ADC $150_1$, with a changing center frequency and/or image setting, thus may be used to receive different channels.

In one embodiment the maximum center frequency for band-pass ADC $150_1$ may be set at or exceeding 4 MHz, in order to cover a given frequency difference in channels to be processed. The flexibility in setting the channels and the bandwidth of ADC $150_1$ may depend on the required steps and coverage of the channels. A system with center frequencies in the set of 1, 2, 3 and 4 MHz and a bandwidth of (just over) 1 MHz would allow coverage of any placement of a fourth channel. A narrower bandwidth of 0.5 MHz would double the oversampling ratio (OSR). A more restricted set of center frequencies such as 1, 2 and 4 MHz may simplify analog circuits at the cost of having less than complete coverage in the case of deployments having large frequency spans.

Assuming a 175 kHz spacing between ADC $150_1$ edge and carrier, and 325 kHz low IF for 100 kbps modulation, possible carrier frequency differences for 1 MHz and 0.5 MHz bandwidths and stepping the band-pass center frequency to 1, 2 and 4 MHz are shown in Table 1 below. Table 1 assumes that the image setting for the low-pass receive path can be set arbitrarily. In a given deployment a fourth channel may be fixed in one part of the low-pass input range (high or low image), and then the possible ranges for the remaining carrier frequencies are obtained by changing both center frequency and image setting for the band-pass ADC (using total bandwidth for the band-pass ADC, and half bandwidth for the low-pass ADC).

TABLE 1

| b/w | $F_{BP} = 1$ | $F_{BP} = 2$ | $F_{BP} = 4$ |
|-----|--------------|--------------|--------------|
| 1   | [0.35; 2.65] |              | [3.35; 4.65] |
| 0.5 | [0.6; 2.4]   | [1.6; 2.4]   | [3.6; 4.4]   |

During operation, ADC $150_1$ may be dynamically controlled to operate at these different center frequencies to detect the presence of incoming signals of different channels, e.g., as transmitted by different devices in a network architecture. To this end, controller 180 is provided to control bandwidth and center frequency of ADC $150_1$ (and also to control a cutoff frequency for ADC $150_0$). Controller 180 further may be configured to control the LO frequency of the mixing signal output from frequency synthesizer 170 and also to control the cutoff frequency for LPF 130, as described herein. In embodiments, controller 180 may be implemented in hardware such as a microcontroller or so forth that executes instructions stored in a non-transitory storage medium such as a firmware storage, flash memory or so forth. Understand that controller 180 may perform further control functions for other components of receiver 100.

With further reference to FIG. 1, the digitized signals output from ADCs $150_{0, 1}$ are provided to a digital processor 160. In different implementations, digital processor 160 may be a single digital signal processor (DSP) that concurrently receives and processes these multiple digitized signal streams. In other cases, separate digital processors may be provided to handle each of the digitized signal streams. In some cases, digital processor 160, which demodulates the received modulated signals, may perform further processing and provide the processed signals corresponding to communicated message information to a given consumer, such as a main processor of an IoT device, as an example.

In an embodiment, the dynamic control of the center frequency of ADC $150_1$ may be implemented using slow frequency hopping to switch between different channels. In a particular embodiment, this slow frequency hopping may be implemented by configuring the band-pass ADC to operate at a given center frequency for a predetermined amount of time, e.g., one millisecond. If a valid preamble is detected during this predetermined period, the band-pass ADC may continue to operate at this center frequency for as long as it takes to receive the message. Thereafter, the band-pass ADC is re-configured to operate at another center frequency in a search for new messages. Such operation may occur iteratively based on configuration of a device in a particular mesh network. For example, if it is known a priori that a network includes devices that only communicate on one or two of multiple possible channels, the band-pass ADC may be dynamically controlled to operate at center frequencies for only these one or two channels. And it is entirely possible that in a particular network, only devices are present that operate at a single one of these multiple channels, such that the control of the pass-band for the band-pass ADC may be statically controlled.

In some use cases, receiver 100 may be configured to operate in a low power mode in which only a single channel of interest is to be received. In such cases, ADC $150_1$ itself may be placed into a low power or idle mode, and the single channel of interest may be digitized in ADC $150_0$. To this end, controller 180 may cause ADC $150_1$ to enter into this low power mode and further control a cutoff frequency of ADC $150_0$ as appropriate for reception of this single channel of interest.

In an embodiment, ADCs 150 may be implemented as sigma delta converters having a desired resolution (e.g., between approximately 10 and 12 bits). In a particular embodiment, these sigma delta converters may be implemented with a modulator architecture having a conjugate arrangement, with two real channels, one for in-phase (I) signals and one for quadrature phase (Q) signals. Such conjugate architecture may be self-contained for ADC $150_0$ and connected via variable cross-coupling for ADC $150_1$. The center frequency of ADC $150_1$ may be changed by changing the cross-coupling between the two real channels. The center frequency is linked to the integration capacitance and the transconductance of the cross-coupling, which is linked by using unit transconductance elements. Understand while shown at this high level in the embodiment of FIG. 1, many variations and alternatives are possible.

Figure 2:
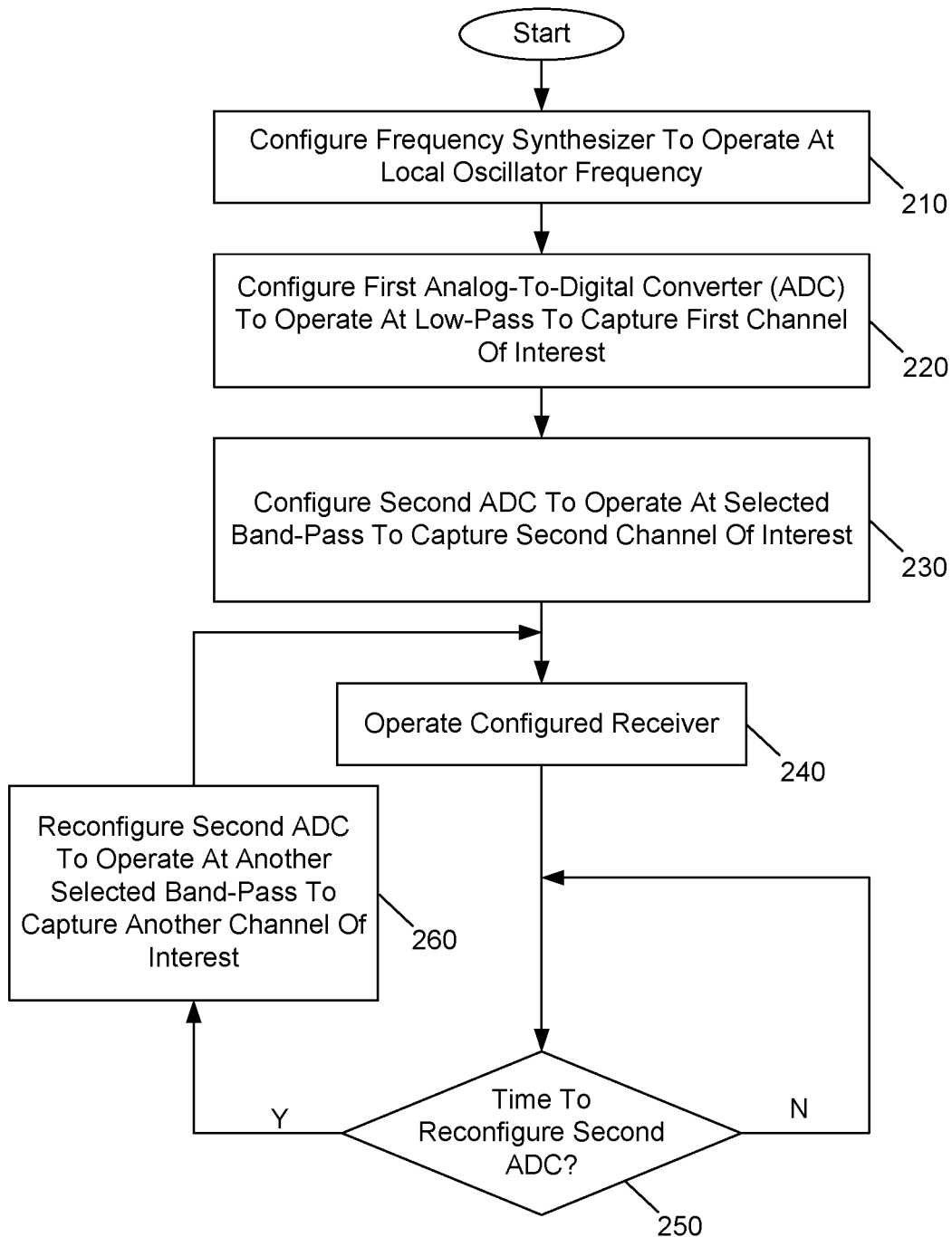
FIG. 2 is a flow diagram of a method in accordance with an embodiment.

Referring now to FIG. 2, shown is a flow diagram of a method in accordance with an embodiment. Method 200 is a method for configuring a receiver having a common front end signal processing path and multiple back end signal processing paths as described herein. In an embodiment, method 200 may be performed by hardware circuitry, firmware, software and/or combinations thereof. In a particular embodiment, method 200 may be performed by a controller of the receiver, such as a microcontroller unit (MCU) or other microcontroller included in or coupled to the receiver. In any event, method 200 begins by configuring a frequency synthesizer of the receiver to operate at a given local oscillator frequency (block 210). This LO frequency may be chosen based at least in part on a channel of interest for a channel to be processed using a low-pass ADC. That is, the LO frequency may be set such that the downconversion of the incoming RF spectrum leads to an IF frequency in which this channel of interest is located at a relatively low intermediate frequency (e.g., less than 0.5 MHz). To configure the frequency synthesizer, the microcontroller may send one or more control signals to the frequency synthesizer to cause it to generate a mixing signal at this LO frequency.

Next control passes to block 220, where a first ADC may be configured to operate at a low-pass frequency to capture this first channel of interest. As discussed above, in one example this first ADC may be set having a center frequency of 250 kHz and a bandwidth of 0.5 MHz. Next, at block 230, a second ADC may be configured to operate at a band-pass frequency to capture this second channel of interest. As discussed above, in one example this second ADC may be set having a given one of multiple center frequencies (e.g., one of 1, 2, or 4 MHz) and a bandwidth of 0.5 MHz.

At this point, the receiver is appropriately configured so that it can receive and process signals of multiple channels of interest concurrently. As such, at block 240 the receiver may operate as configured.

Because one or more ADCs or other band-pass filters may be dynamically controlled to operate at different frequencies, as further shown in FIG. 2 it may be determined at diamond 250 whether it is time to reconfigure the second ADC (and optionally a low-pass filter of the common receiver signal processing path). As described above, in an embodiment such reconfiguring may occur according to a slow frequency hopping technique. If it is determined that reconfiguration is appropriate, control passes next to block 260 where the second ADC may be reconfigured. More specifically, the second ADC may be re-configured to operate at a different center frequency (and optionally a different bandwidth). And optionally, the low-pass filter also may be reconfigured to operate at a different cutoff frequency. Thereafter, continued operation of the receiver with this new configuration may occur. Note that it is possible for the low-pass path to continue receiving and processing signals while the second path undergoes reconfiguration. Understand while shown at this high level in the embodiment of FIG. 2, many variations and alternatives are possible.

Figure 3:
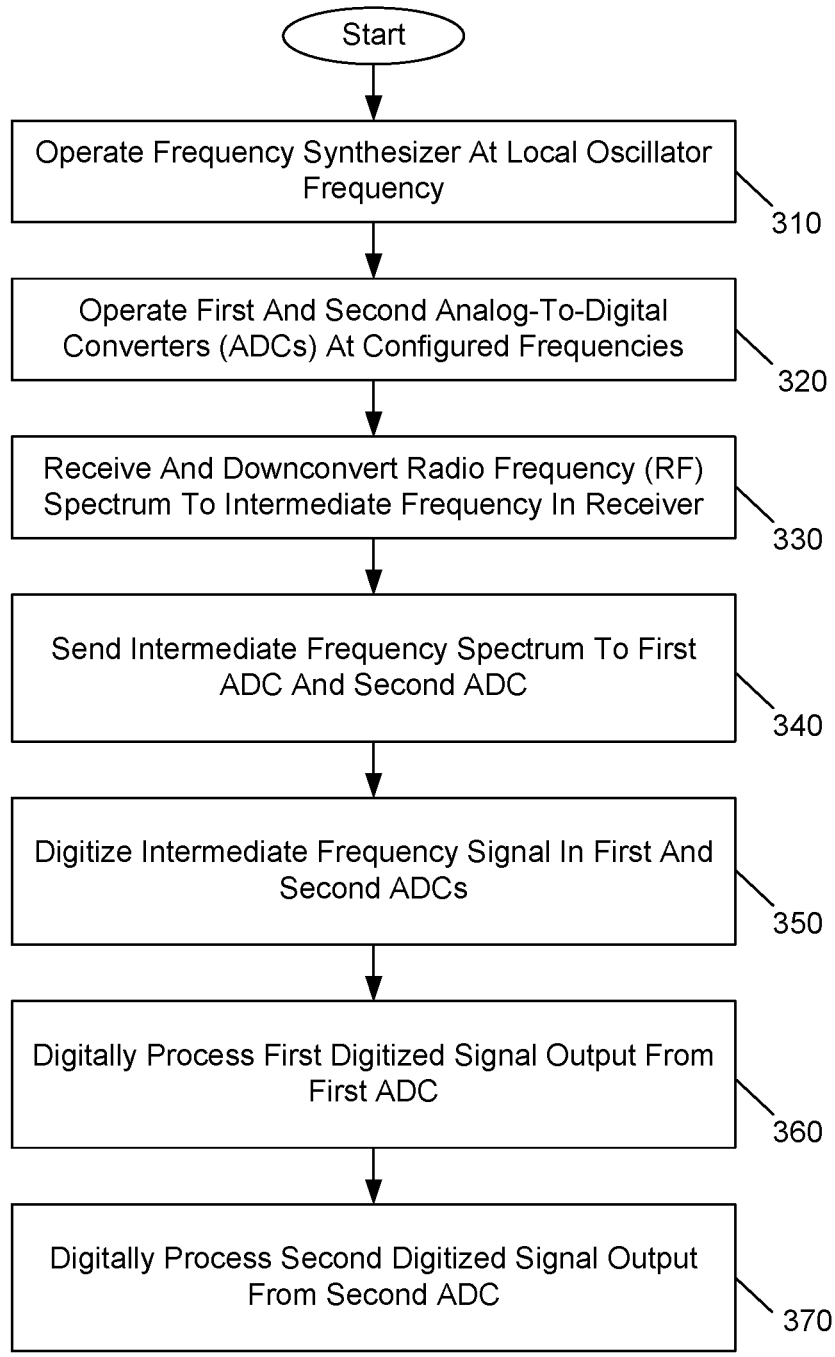
FIG. 3 is a flow diagram of a method in accordance with another embodiment.

Referring now to FIG. 3, shown is a flow diagram of a method in accordance with another embodiment. More specifically, method 300 is a method for concurrently processing signals of multiple paths in a receiver in accordance with an embodiment. As an example, method 300 may correspond to the operation of the configured receiver as shown at block 240 in FIG. 2.

In an embodiment, method 300 may be performed by receiver components as described herein. In an embodiment, method 300 may be performed by hardware circuitry, firmware, software and/or combinations thereof. As illustrated, method 300 begins at block 310 by operating the frequency synthesizer to output a mixing signal at a given LO frequency. This mixing signal having the LO frequency is provided to a mixer, which downconverts the RF signal to an IF level using the mixing signal.

Thereafter at block 320 the ADCs may be controlled to operate at their configured frequencies (e.g., having particular signed center frequencies and bandwidths). Additional configuration of the ADCs, such as their resolution levels, power consumption and so forth also may be set. Note also that the gain of each ADC is also programmable with a gain set by an AGC subsystem.

With the receiver operating according to its configured parameters, next at block 330 an incoming RF spectrum is received and downconverted to an intermediate frequency, using the mixer. Then the IF spectrum may be sent to parallel back end signal processing paths including separate ADCs, with one ADC configured as a low-pass ADC and the other configured as a band-pass ADC. Of course additional parallel processing paths may be present in a given embodiment. Note that additional signal processing of the IF spectrum may occur prior to being passed to the ADCs. In any case, at block 350, IF signals are digitized in both ADCs to extract information of different channels of interest, if present. If so, at blocks 360 and 370, independent digital processing of the recovered digitized signals may be performed. In one embodiment, a single DSP as implemented within the same IC as the receiver may perform various processing, including any additional filtering, decoding and demodulation to extract any message information present in the digitized signals. Understand of course that such message content may be sent to a given consumer, e.g., of an IoT device including the receiver. Although shown at this high level in the embodiment of FIG. 3, many variations and alternatives are possible.

Figure 4A:
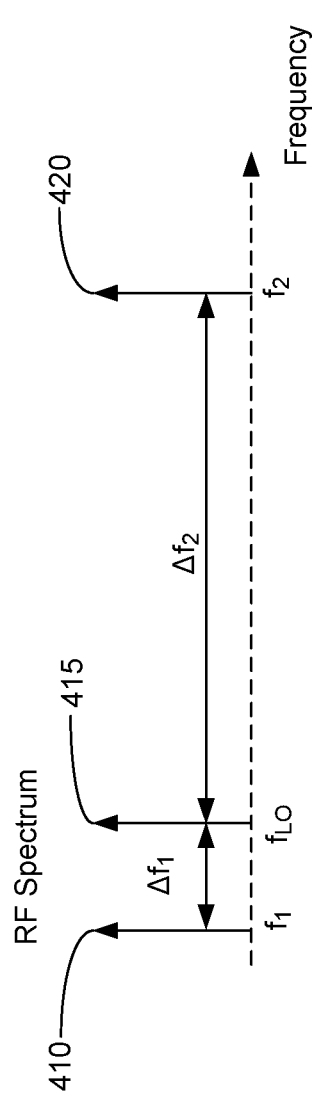
FIGS. 4A and 4B are illustrations of RF and IF frequency spectrums in accordance with an embodiment.
Figure 4B:
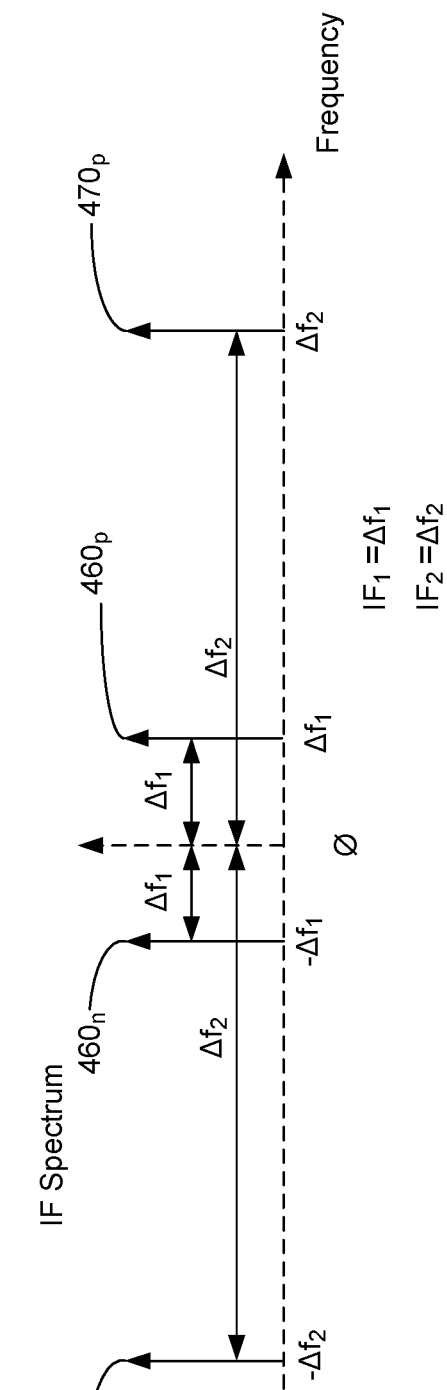

Referring now to FIGS. 4A and 4B, shown are illustrations of RF and IF frequency spectrums in accordance with an embodiment. As illustrated first in FIG. 4A, an RF spectrum 400 includes multiple RF signals of interest, namely a first RF signal 410 at a first frequency $f_1$ corresponding to a first channel of interest and a second RF signal 420 at a second frequency $f_2$ corresponding to a second channel of interest. These incoming RF signals are mixed with an LO signal, namely LO signal 415 at a LO frequency ($f_{LO}$) to downconvert them to lower second frequencies. As seen, first RF signal 410 is at a lower frequency than LO signal 415 (namely separated from the LO frequency by a frequency difference of $\Delta f_1$). Second RF signal 420 is at a higher frequency than LO signal 415 (namely separated from the LO frequency by a frequency difference of $\Delta f_2$). In embodiments, the LO frequency may be controlled such that it is at a frequency between the frequencies of the two channels of interest.

Referring now to FIG. 4B, shown is an illustration of IF signals generated using a complex mixer. In an IF spectrum 450, the corresponding RF signals have been downconverted to IF signals. More specifically, each RF signal is downconverted into two IF signals at positive and negative frequencies. As such, IF signals $460_p$ and $460_p$ are corresponding negative and positive frequency IF signals resulting from the downconversion of first RF signal 410. As illustrated, IF signals $460_{n,p}$ are at corresponding $\pm\Delta f_1$ frequencies from 0 Hz. Similarly, negative and positive second IF signals $470_{n,p}$ are at corresponding IF frequencies of $\pm\Delta f_2$ from 0 Hz. With embodiments herein, a low-pass ADC may be configured to pass one of first IF signals 460 and similarly, a band-pass ADC may be configured to pass one of second IF signals 470. In an embodiment, the ADCs may be configured to pass a positive or negative one of the different IF signals.

Figure 5:
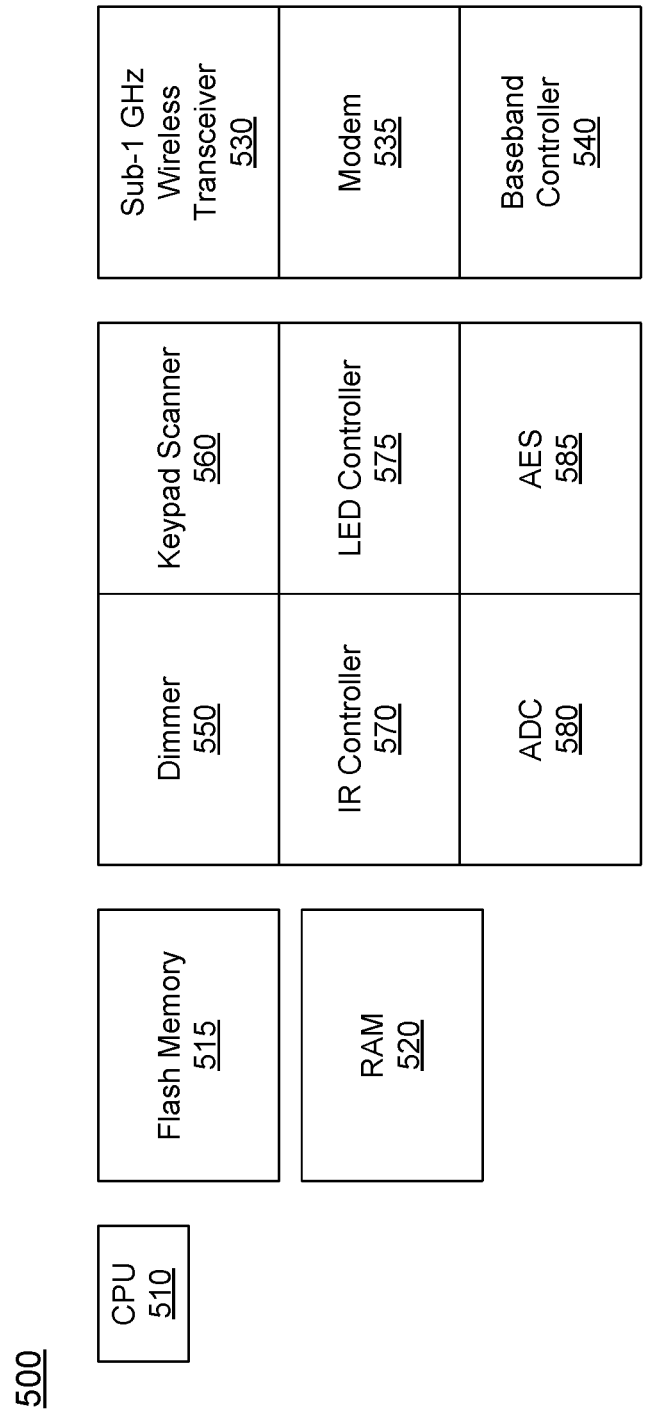
FIG. 5 is a block diagram of an example integrated circuit in accordance with an embodiment.

Embodiments may be used in many different types of receivers. For purposes of illustration, an example integrated circuit is described at a high level. As illustrated in FIG. 5, integrated circuit 500 is a system in package (SiP), which may be an IoT device to provide a variety of different functionality, including controller functionality, sensing functionality, actuator functionality or other automation or security functions.

In the high level shown in FIG. 5, IC 500 includes a main processor 510, which may be implemented as a given central processing unit (CPU). Main processor 510, which may perform the primary functions of the device, is in communication with memories including a non-volatile memory 515, e.g., a flash memory, and a volatile memory, e.g., a random access memory (RAM) 520. Additional functionality may be provided by a variety of engines, including a dimmer engine 550, a keypad scanner 560, an infrared (IR) controller 570, a light emitting diode (LED) controller 575, an ADC 580, and a security engine 585, e.g., in accordance with a given advanced encryption standard (AES) security protocol.

As further illustrated, to enable wireless communication, e.g., within a given mesh network, a sub-gigahertz wireless transceiver 530 is present. In embodiments, wireless transceiver 530 may include a single front end receiver signal processing path and multiple digitizers, e.g., low-pass ADC and at least one controllable band-pass ADC as described herein to enable multiple physically separated channels of interest to be concurrently received and processed. This arrangement may be realized with minimal chip and power consumption requirements, owing to the common front end receiver path. As further shown, wireless transceiver 530 couples to a modem 535 which may perform modulation and demodulation operations to communicate corresponding signals with CPU 510 and other components within IC 500. As further shown, a baseband controller 540 is present to control configuring of pass-bands for frequency hopping. Understand while shown at this high level in the embodiment of FIG. 5, many variations and alternatives are possible.

Figure 6:
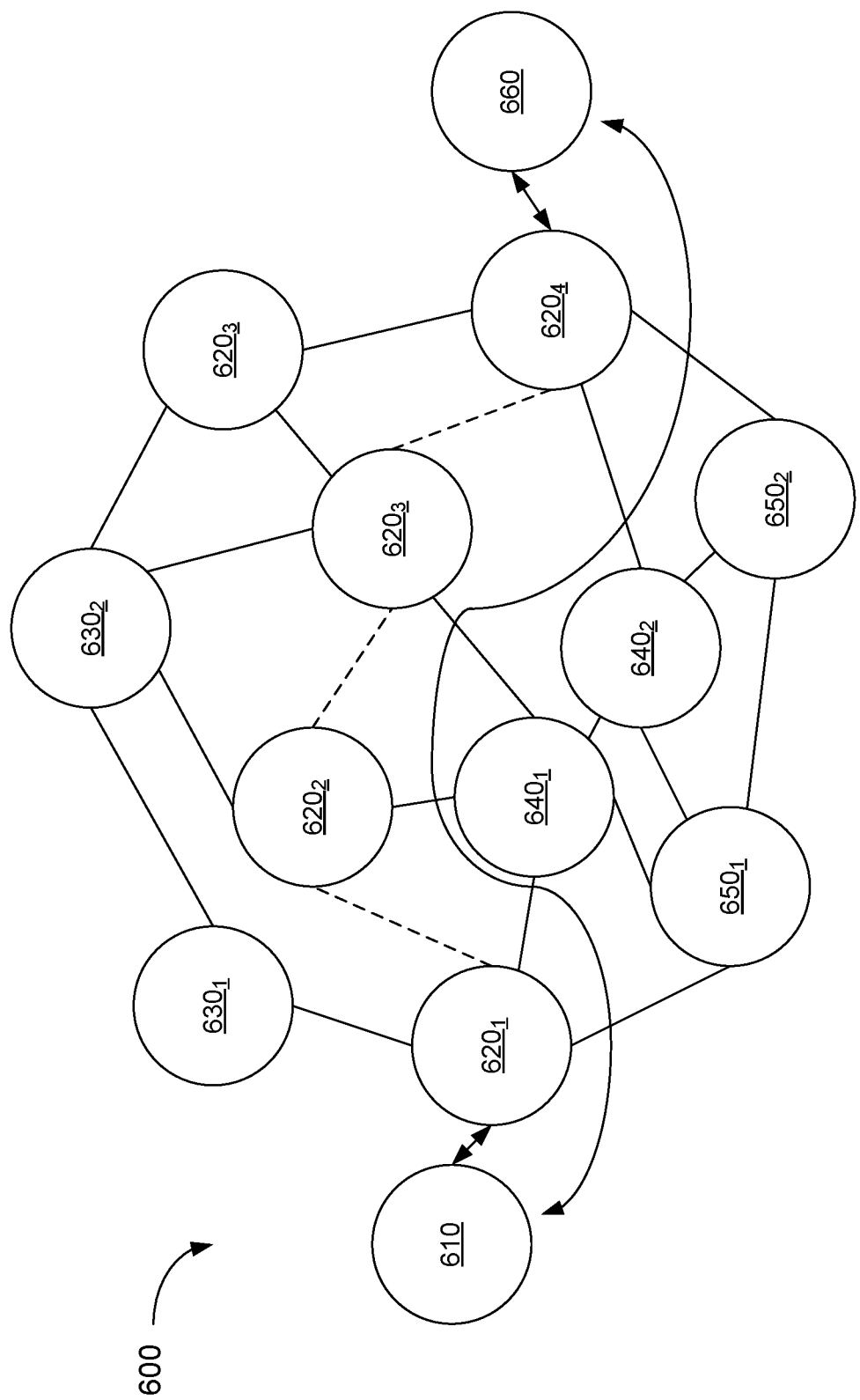
FIG. 6 is a block diagram of mesh network in accordance with an embodiment.

IoT devices including a receiver in accordance with embodiments may be incorporated in many different types of networking systems. In particular situations, IoT devices may be used in mesh networks such as a home area network (HAN) or other building or network arrangement. Referring now to FIG. 6, shown is a block diagram of mesh network 600 in accordance with an embodiment. As shown in FIG. 6, a plurality of devices including IoT devices couple together via a mesh.

To enable communication from a controller 610 to a given device 660, e.g., a door lock, a two-way path may be realized via intermediate devices, including devices 620$_1$-620$_4$. Additional mesh network devices include devices 630$_1$-630$_3$, devices 640$_1$-640$_2$ and devices 650$_1$-650$_2$. With an arrangement as in FIG. 6, devices may operate in a low power mode where they may primarily operate in a sleep mode to reduce battery consumption, as many or all devices within mesh network 600 may be battery-operated devices. To this end, embodiments may implement a beam-based wakeup technique in which, e.g., controller 610 issues a beam signal that is received, e.g., by device 660. Upon receipt of this beam signal intended for it, device 660 exits the low power state into an active state to perform a given function, in response to a command from controller 610.

With embodiments, during low power mode device 640 may be controlled to listen for a single channel on which this beam communication occurs. To this end, device 640 may be configured such that its low-pass ADC is active to listen for this beam signal while its band-pass ADC is placed in an idle, low power state. When detection of a beam signal intended for device 640 is detected, device 640 may cause its band-pass ADC to be placed into an active mode to receive signals on one or more other channels of interest, namely main band signals via which it may receive command information, data information or so forth.

With embodiments herein, various devices in mesh network 600 may communicate with multiple other devices operating at different frequencies using selective frequency hopping as described herein. In particular examples, devices within mesh network 600 may operate at frequencies between approximately 850 MHz and 930 MHz. To enable a given receiver to communicate with multiple such devices operating at different frequencies, dynamic configuration of one or more low-pass filters, low-pass ADCs and band-pass ADCs may be performed to enable a receiver to dynamically and concurrently receive signals communicated in multiple physically separate channels. Understand while shown at this high level in the embodiment of FIG. 6, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
 a low noise amplifier (LNA) to receive and amplify a radio frequency (RF) spectrum including at least a first RF signal of a first channel of interest and a second RF signal of a second channel of interest;
 a mixer to downconvert the first RF signal to a first second frequency signal and to downconvert the second RF signal to a second second frequency signal;
 a first digitizer to digitize the first second frequency signal to a first digitized signal, the first digitizer configured to operate as a low-pass analog-to-digital converter (ADC);
 a second digitizer to digitize the second second frequency signal to a second digitized signal, the second digitizer configured to operate as a band-pass ADC;
 a digital processor to digitally process the first digitized signal and the second digitized signal; and
 a controller to configure a local oscillator to generate a mixing signal having a frequency between a frequency of the first channel of interest and a frequency of the second channel of interest, wherein the controller is to dynamically control a center frequency for the second digitizer to perform frequency hopping for a plurality of channels of interest.

2. The apparatus of claim 1, wherein the mixer comprises a complex mixer to downconvert the first RF signal to positive and negative first second frequency signals and downconvert the second RF signal to positive and negative second second frequency signals.

3. The apparatus of claim 1, wherein the controller is:
 for a first time period, to configure the second digitizer to operate at a first center frequency to digitize and pass the second channel of interest; and
 for a second time period, to configure the second digitizer to operate at a second center frequency to digitize and pass a third channel of interest.

4. The apparatus of claim 1, further comprising a low-pass filter coupled between the mixer and the first and second digitizers, wherein the controller is to configure the low-pass filter to operate at plurality of cutoff frequencies, each of the plurality of cutoff frequencies associated with a corresponding center frequency for the second digitizer.

5. The apparatus of claim 1, wherein the controller is to cause the second digitizer to be powered off when the apparatus is in operation in a low power mode.

6. The apparatus of claim 1, wherein the first digitizer is to digitize information of the first channel of interest, wherein the first channel of interest is a fixed channel and the frequency of the mixing signal is to be fixed.

7. The apparatus of claim 1, wherein the first digitizer and the second digitizer comprise delta-sigma converters.

8. The apparatus of claim 1 wherein the first digitizer and the second digitizer comprise complex ADCs.

9. A method comprising:
configuring, via a controller, a first analog-to-digital converter (ADC) of a receiver to operate at a low-pass to capture a first channel of interest;
configuring, via the controller, a second ADC of the receiver to operate at a band-pass to capture a second channel of interest;
receiving, in a common receiver signal processing path of the receiver, a radio frequency (RF) spectrum, downconverting the RF spectrum to an intermediate frequency (IF) spectrum including the first channel of interest and the second channel of interest, and providing the IF spectrum from the common receiver signal processing path to the first ADC and the second ADC;
in the first ADC, digitizing the first channel of interest into a first digitized signal and providing the first digitized signal to at least one digital processor;
in the second ADC, digitizing the second channel of interest into a second digitized signal and providing the second digitized signal to the at least one digital processor; and
re-configuring, via the controller, the second ADC to operate at a second band-pass to capture a third channel of interest.

10. The method of claim 9, further comprising:
configuring a low-pass filter of the common receiver signal processing path to operate at a first cutoff frequency to enable the second channel of interest to be passed; and
re-configuring the low-pass filter to operate at a second cutoff frequency to enable the third channel of interest to be passed.

11. The method of claim 10, further comprising re-configuring the low-pass filter and the second ADC according to a predetermined schedule to enable frequency hopping for a plurality of channels of interest.

12. The method of claim 9, further comprising:
causing the second ADC to enter into a low power mode;
detecting a beam signal via the first ADC; and
in response to the beam signal, causing the second ADC to exit the low power mode to enable the second ADC to digitize the second channel of interest.

13. A system comprising:
a first internet of things (IoT) device to perform one or more functions, the first IoT device comprising:
a common receiver signal processing path having a low noise amplifier (LNA) to receive and amplify a radio frequency (RF) spectrum including at least a first RF signal of a first channel of interest and a second RF signal of a second channel of interest, and a mixer to downconvert the first RF signal to a first intermediate frequency (IF) signal and to downconvert the second RF signal to a second IF signal;
a first analog-to-digital converter (ADC) coupled to the common receiver signal processing path to digitize the first IF signal to a first digitized signal, the first ADC configured to operate at a low-pass;
a second ADC coupled to the common receiver signal processing path to digitize the second IF signal to a second digitized signal, the second ADC configured to operate at a controllable band-pass; and
a digital processor to digitally process the first digitized signal and the second digitized signal; and
a plurality of devices coupled to the first IoT device, wherein at least one of the plurality of devices comprises a control device to communicate with the first IoT device via at least another one of the plurality of devices.

14. The system of claim 13, wherein the first IoT device further comprises a controller to configure a local oscillator to generate a mixing signal having a frequency between a frequency of the first channel of interest and a frequency of the second channel of interest.

15. The system of claim 14, wherein the controller is to dynamically control a center frequency for the second ADC to perform frequency hopping for a plurality of channels of interest, wherein the controller is to cause the second ADC to operate for a first time period at a first center frequency to digitize and pass the second channel of interest and to operate for a second time period at a second center frequency to digitize and pass a third channel of interest.

16. The system of claim 14, wherein the common receiver signal processing path comprises a low-pass filter, and the controller is to configure the low-pass filter to operate at plurality of cutoff frequencies, each of the plurality of cutoff frequencies associated with a corresponding center frequency at which the second ADC is to operate.

17. The system of claim 14, wherein the controller is to cause the second ADC to enter into a low power mode, and in response to a beam signal received from the control device, cause the second ADC to exit the low power mode to enable the second ADC to digitize and pass the second channel of interest.

* * * * *